(12) United States Patent
Kang et al.

(10) Patent No.: US 7,548,960 B2
(45) Date of Patent: Jun. 16, 2009

(54) MULTIMEDIA SERVICE APPARATUS AND METHOD FOR MULTIMEDIA SERVICE PROVIDERS OUTSIDE HOME TO UPNP DEVICES INSIDE HOME USING HOME GATEWAY AND SERVICE GATEWAY PLATFORM

(75) Inventors: Dong Oh Kang, Taejon (KR); Kyu Chang Kang, Taejon (KR); Jeun Woo Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 792 days.

(21) Appl. No.: 11/132,270

(22) Filed: May 19, 2005

(65) Prior Publication Data

US 2006/0133391 A1 Jun. 22, 2006

(30) Foreign Application Priority Data

Dec. 22, 2004 (KR) ...................... 10-2004-0110735

(51) Int. Cl.
 *G06F 15/16* (2006.01)
(52) U.S. Cl. ...................... 709/218; 709/202; 709/249; 725/109
(58) Field of Classification Search ................ 709/202, 709/218, 249; 725/109
 See application file for complete search history.

(56) References Cited

U.S. PATENT DOCUMENTS 7,376,723 B2 * 5/2008 Cho et al. .................... 709/223
7,392,304 B2 * 6/2008 Kang et al. .................. 709/223
2004/0139177 A1 * 7/2004 Yook ........................... 709/220
2004/0210912 A1 * 10/2004 Jeronimo ..................... 719/328
2005/0138037 A1 * 6/2005 Son et al. ....................... 707/10
2006/0112192 A1 * 5/2006 Stewart et al. .............. 709/249
2006/0218180 A1 * 9/2006 Bodlaender et al. ..... 707/103 R

FOREIGN PATENT DOCUMENTS

KR 1020030055766 7/2003
KR 1020040005464 1/2004

* cited by examiner

*Primary Examiner*—David Lazaro
(74) *Attorney, Agent, or Firm*—Lowe Hauptman Ham & Berner, LLP (57) ABSTRACT

A multimedia service apparatus and method for multimedia service providers outside home to UPnP devices inside home using a home gateway and a service gateway platform is provided. In the multimedia service apparatus and method, the home gateway and the service gateway platform such as an open service gateway initiative (OSGi) service platform are used inside a home so that the multimedia service providers outside home can provide a multimedia content on a home network to a universal plug and play (UPnP) audio/video (AV) MediaRenderer following a UPnP AV structure based on UPnP, to reproduce or store the multimedia content in a UPnP AV MediaServer. The multimedia service apparatus includes: a UPnP AV (audio/video) device connected to a home network by the multimedia service provider of an external network; and a gateway device providing a multimedia service to the UPnP AV device using the service gateway platform.

25 Claims, 8 Drawing Sheets

MULTIMEDIA SERVICE APPARATUS AND METHOD FOR MULTIMEDIA SERVICE PROVIDERS OUTSIDE HOME TO UPNP DEVICES INSIDE HOME USING HOME GATEWAY AND SERVICE GATEWAY PLATFORM

BACKGROUND OF THE INVENTION

1. Field of the Invention

The present invention relates to a multimedia service apparatus and method for multimedia service providers outside home to UPnP devices inside home using a home gateway and a service gateway platform, and more particularly, to a multimedia service apparatus and method for multimedia service providers outside home to UPnP devices inside home using a home gateway and a service gateway platform in which the home gateway and the service gateway platform such as an open service gateway initiative (OSGi) service platform are used inside a home to allow the multimedia service providers outside home to provide and reproduce a multimedia content on a home network to and in a universal plug and play (UPnP) audio/video (AV) MediaRenderer following a UPnP AV structure based on UPnP, or store the multimedia content in a UPnP AV MediaServer.

2. Description of the Related Art

In a conventional method for providing a multimedia content from an outside home to a multimedia device inside home, when the multimedia device inside home operates as a client and requests a server of a service provider outside home for the multimedia content, the server outside home transmits the multimedia content to the multimedia device inside home through a home gateway. Accordingly, a user requests for content transmission through a user interface of the device inside home, and controls transmission. This method is performed using an inherent protocol of each multimedia service provider such as windows media services (WMS), real time streaming protocol (RTSP), and hyper text transfer protocol (HTTP). Therefore, each client needs the user interface using the inherent protocol. A UPnP AV structure is basically constructed suitably to UPnP AV devices positioned on an internal home network of a home gateway. Therefore, it is not suitable that the UPnP AV structure gets a multimedia service from the multimedia service provider not using UPnP outside home. In order to allow the multimedia service provider to provide the multimedia service for the UPnP device inside home using a UPnP protocol, the home gateway should perform a discovery and control using the UPnP protocol for a UPnP proxy. Accordingly, there is a drawback in that a new UPnP device in addition to a conventional inherent protocol should be constructed in the server treating the discovery and control.

SUMMARY OF THE INVENTION

Accordingly, the present invention is directed to a multimedia service apparatus and method for multimedia service providers outside home to UPnP devices inside home using a home gateway and a service gateway platform, which substantially obviates one or more problems due to limitations and disadvantages of the related art.

It is an object of the present invention to provide a multimedia service apparatus and method for multimedia service providers outside home to UPnP devices inside home using a home gateway and a service gateway platform in which the home gateway and the service gateway platform such as an open service gateway initiative (OSGi) service platform are used to allow the multimedia service providers outside home to operate a virtual UPnP MediaServer service bundle on the service gateway platform of the home gateway through an external network such as internet so that a user inside home can get an external multimedia service in a device following a UPnP AV structure, using a UPnP AV control point, without an additional device.

It is another object of the present invention to provide a multimedia service apparatus and method for multimedia service providers outside home to UPnP devices inside home using a home gateway and a service gateway platform in which the service gateway platform for dynamically mounting and initiating a bundle is managed on the home gateway, thereby allowing a user of the UPnP AV device inside home to use the multimedia service provided from the multimedia service providers outside home without an additional device other than a UPnP device, allowing the multimedia service providers outside home to provide the multimedia service using an inherent protocol such as windows media services (WMS), real time streaming protocol (RTSP) and hyper text transfer protocol (HTTP) without using a UPnP AV structure, and allowing the multimedia service providers outside home to optimally select a selection item, such as a multimedia transmission protocol and a content format, on the basis of information on the UPnP AV device inside home, thereby making it possible to provide a home-adaptive multimedia service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a multimedia service apparatus for multimedia service providers outside home to UPnP (universal plug and play) devices inside home using a home gateway and a service gateway platform, the apparatus including: a UPnP AV (audio/video) device connected to a home network by the multimedia service provider of an external network; and a gateway device providing a multimedia service to the UPnP AV device using the service gateway platform.

In another aspect of the present invention, there is provided a multimedia service apparatus for multimedia service providers outside home to UPnP (universal plug and play) devices inside home using a home gateway and a service gateway platform, the apparatus including: a UPnP AV (audio/video) device connected to a home network and supporting a UPnP AV structure; and a gateway device for managing a UPnP AV control point bundle in the service gateway platform, the UPnP AV control point bundle collecting and transmitting information on the UPnP AV device to an external multimedia service bundle through a service call of a service bundle or other ways.

In a further another aspect of the present invention, there is provided a multimedia service method for multimedia service providers outside home to UPnP (universal plug and play) devices inside home using a home gateway and a service gateway platform, the method including the steps of: constructing a virtual UPnP AV (audio/video) MediaServer service bundle suitable to a current home network environment and a provided content, on the basis of UPnP AV device information of a home network from an external multimedia service bundle; and downloading the service bundle to the home gateway and managing the service bundle in the service gateway platform to provide a multimedia service to the UPnP AV device inside home.

In a still further another aspect of the present invention, there is provided a multimedia service method for multimedia service providers outside home to UPnP (universal plug and play) devices inside home using a home gateway and a service gateway platform, the method including the steps of: constructing an attribute of a virtual UPnP AV (audio/video) MediaServer suitable to a current home network environment and a provided content, on the basis of UPnP AV device information of a home network from an external multimedia service bundle; and transmitting the attribute to the external multimedia service bundle of the home gateway to allow the external multimedia service bundle to generate and manage a virtual UPnP AV MediaServer service bundle in the external multimedia service bundle, thereby providing a multimedia service from a network outside home to the UPnP AV device inside home.

In an even further another aspect of the present invention, there is provided a multimedia service method for multimedia service providers outside home to UPnP (universal plug and play) devices inside home using a home gateway and a service gateway platform, the method including the steps of: transmitting a content of the most suitable format from the multimedia service provider outside home to a designated port of an external network interface of the home gateway, on the basis of transmitted information and a request of a virtual UPnP AV (audio/video) MediaServer service bundle of the home gateway; and transmitting the content from a virtual UPnP AV MediaServer service bundle to an allocated port of a home network interface, to perform content transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
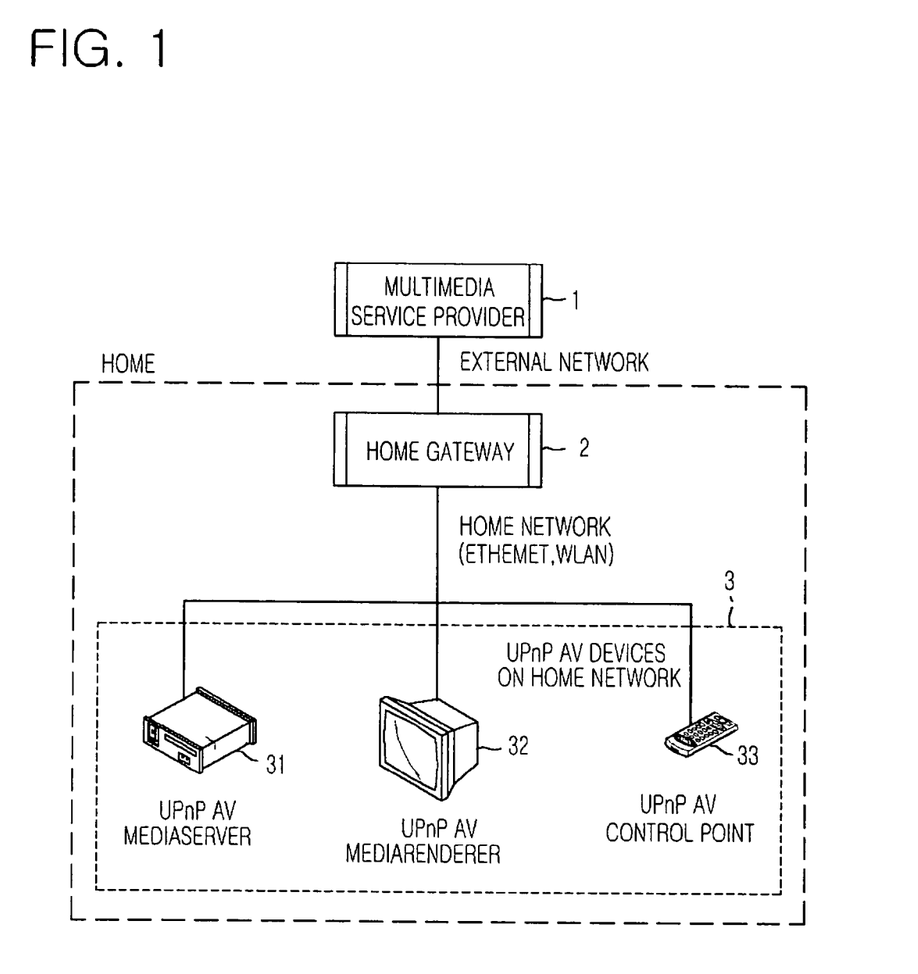
FIG. 1 illustrates a functional construction of a multimedia service apparatus for multimedia service providers outside home to universal plug and play (UPnP) devices inside home using a home gateway and a service gateway platform according to an embodiment of the present invention.
Figure 2:
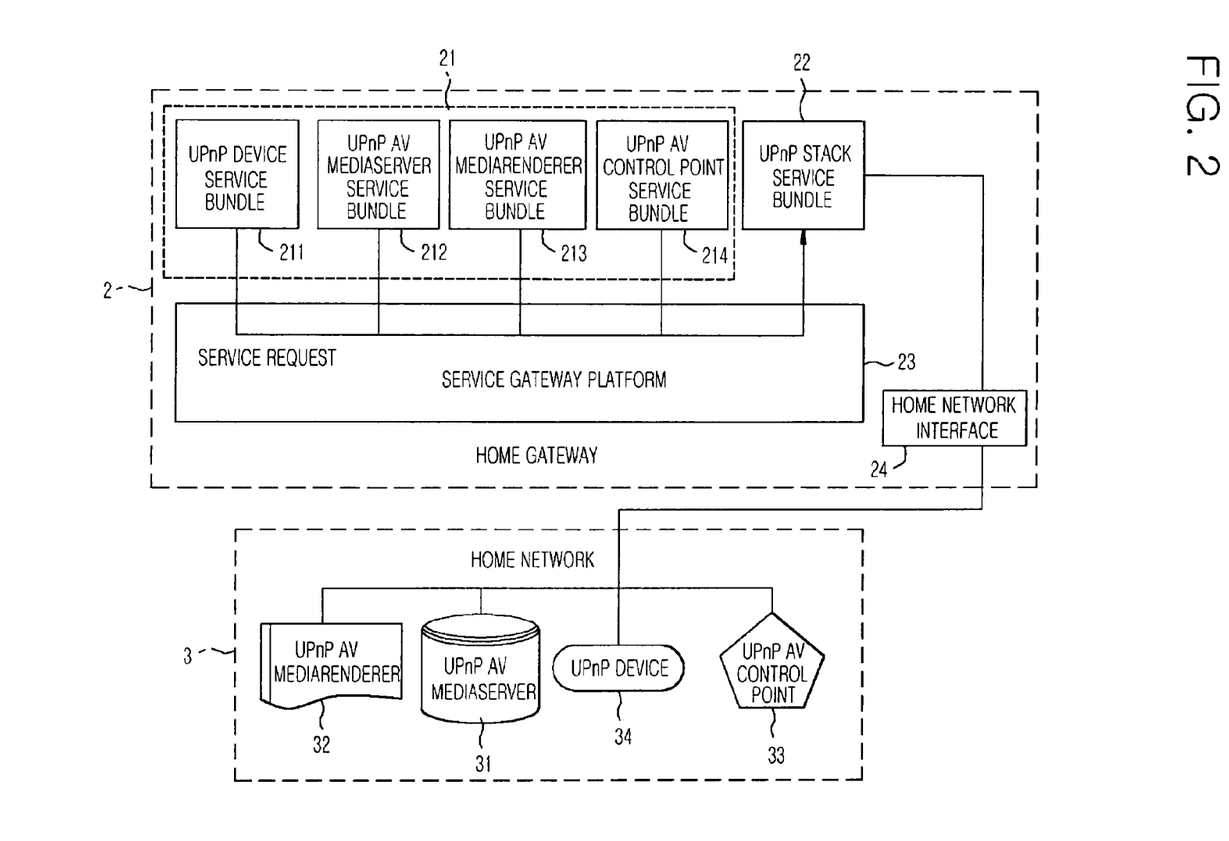
FIG. 2 illustrates a construction of a service bundle on a service gateway platform for a UPnP stack of FIG. 1.
Figure 3:
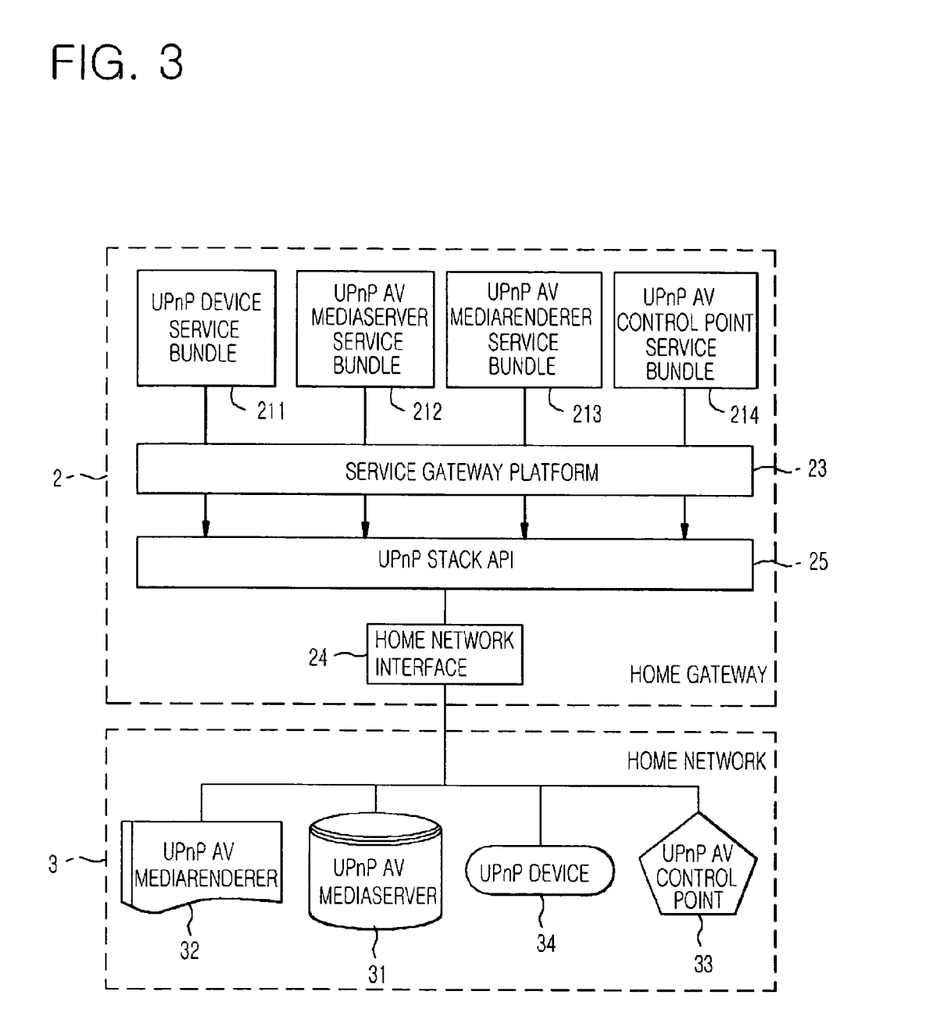
FIG. 3 illustrates a functional construction of a UPnP stack of a home gateway using a UPnP stack application program interface (API) of FIG. 1.
Figure 4:
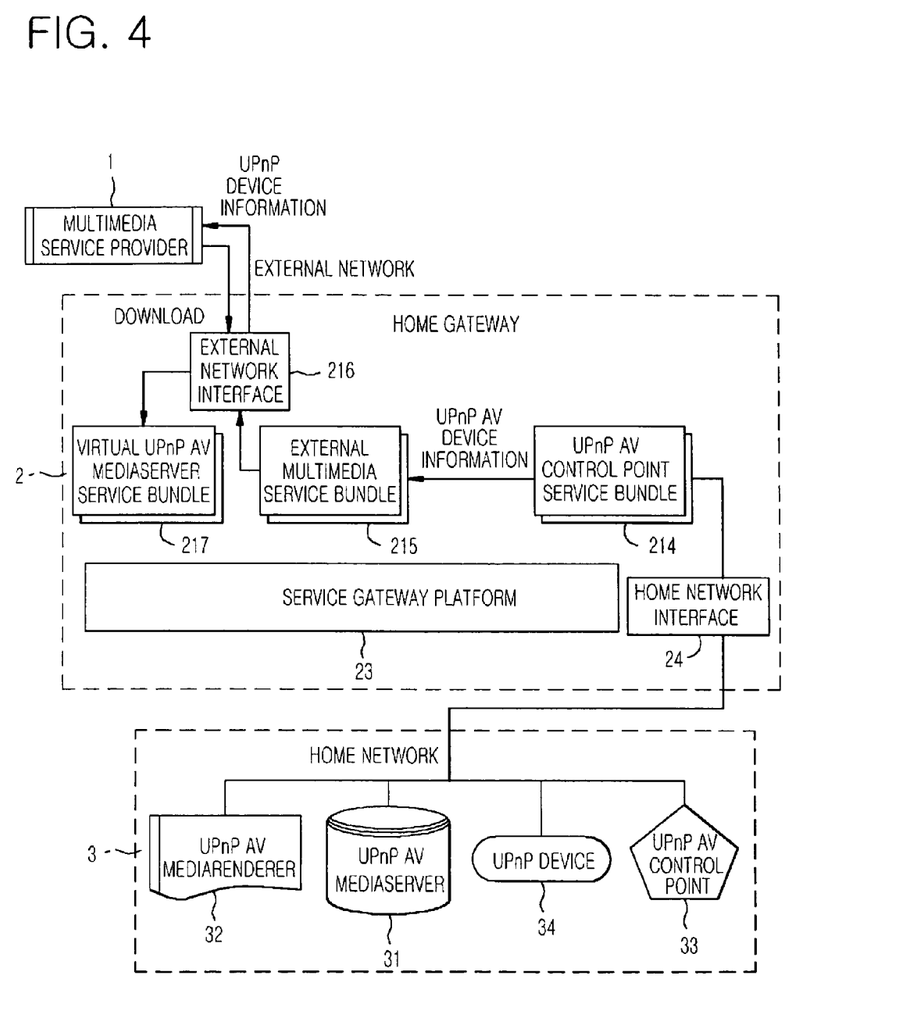
FIG. 4 illustrates a functional construction for downloading a virtual UPnP AV MediaServer service bundle of FIG. 1.
Figure 5:
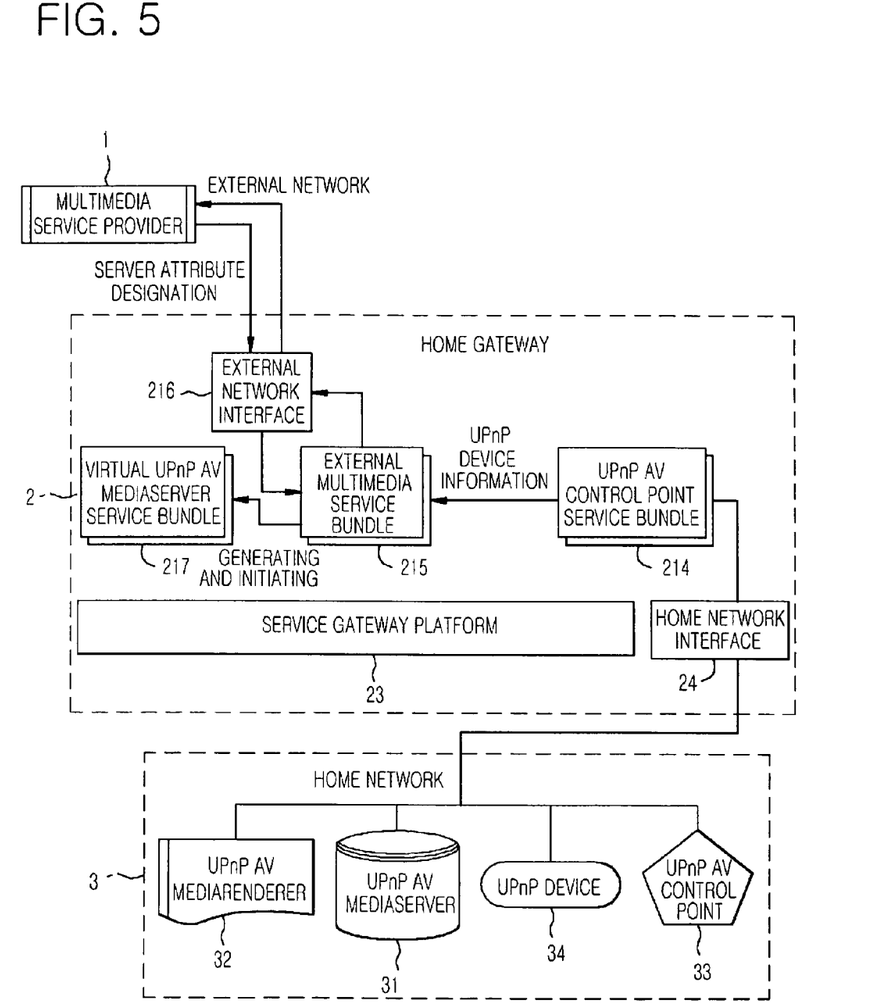
FIG. 5 illustrates a functional construction for generating a virtual UPnP AV MediaServer service bundle through an attribute designation of a virtual UPnP AV MediaServer service bundle of FIG. 1.
Figure 6:
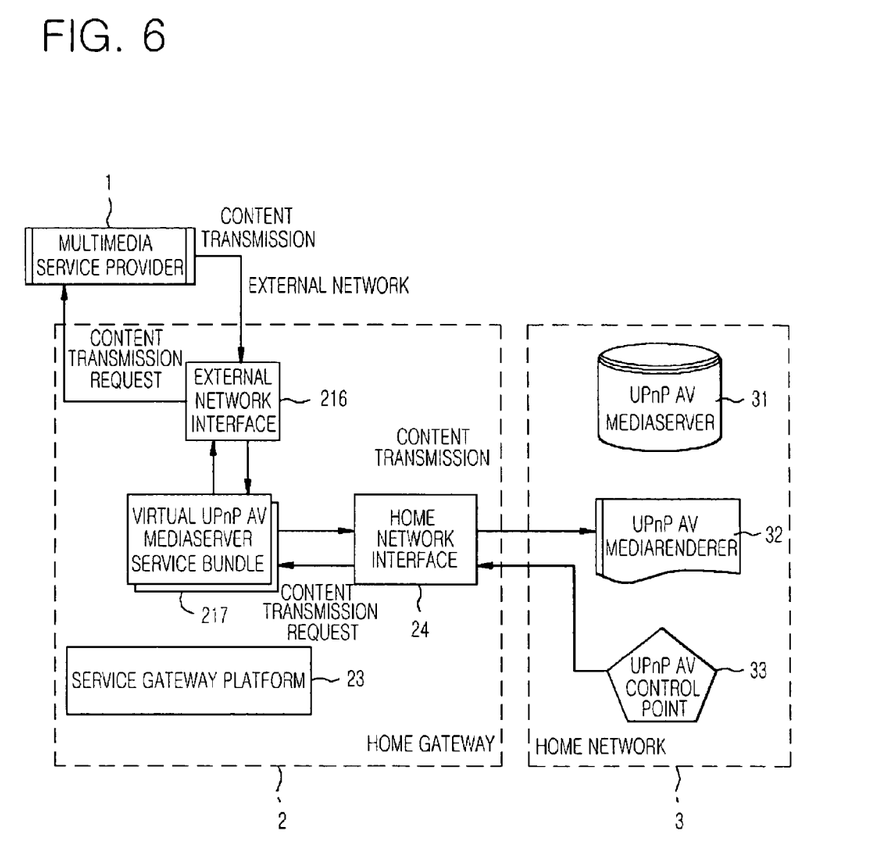
FIG. 6 illustrates a functional construction for content transmission of a virtual UPnP AV MediaServer service bundle of FIG. 1.

FIG. 1 illustrates a functional construction of a multimedia service apparatus for multimedia service providers outside home to universal plug and play (UPnP) devices inside home using a home gateway and a service gateway platform according to an embodiment of the present invention. FIG. 2 illustrates a construction of a service bundle on the service gateway platform for a UPnP stack of FIG. 1. FIG. 3 illustrates a functional construction of the UPnP stack of the home gateway using a UPnP stack application program interface (API) of FIG. 1. FIG. 4 illustrates a functional construction of downloading a virtual UPnP AV MediaServer service bundle of FIG. 1. FIG. 5 illustrates a functional construction of generating the virtual UPnP AV MediaServer service bundle through an attribute designation of the virtual UPnP AV MediaServer service bundle of FIG. 1. FIG. 6 illustrates a functional construction of content transmission the virtual UPnP AV MediaServer service bundle of FIG. 1.

As shown in FIG. 1, the inventive multimedia service apparatus includes the multimedia service provider 1, the home gateway 2, and UPnP AV devices 3 of a home network.

As shown in FIG. 2, the home gateway 2 includes a UPnP stack service request bundle 21, a UPnP stack service bundle 22, a service gateway platform 23, and a home network interface 24.

The UPnP stack service request bundle 21 includes a UPnP device service bundle 211, a UPnP AV MediaServer service bundle 212, a UPnP AV MediaRenderer service bundle 213, and a UPnP AV control point service bundle 214.

As shown in FIG. 3, the home gateway 2 further includes a UPnP stack API 25.

As shown in FIG. 4, the home gateway 2 further includes an external multimedia service bundle 215, the virtual UPnP AV MediaServer service bundle 217, and an external network interface 216.

The multimedia service provider 1 is connected to an external network through the home gateway 2 to acquire information on the UPnP AV devices 3 from the home network. Accordingly, the virtual UPnP AV MediaServer service bundle 217, which is suitable to the information on the UPnP AV devices 3, can be downloaded to the service gateway platform 23, or the virtual UPnP AV MediaServer service bundle 217 can be generated by the external multimedia service bundle 215 through an attribute designation of a UPnP AV MediaServer so that the virtual UPnP AV MediaServer service bundle 217 is initiated in the service gateway platform 23 of the home gateway 2 to provide the external multimedia service without an additional device in such a manner that a user inside home uses a UPnP AV structure. The multimedia service provider 1 has a multimedia server storing various multimedia contents and connected with the home gateway 2 through the network outside home, and designates an attribute of the virtual UPnP AV MediaServer service bundle 217 to the virtual UPnP AV MediaServer to inform other home network UPnP devices of a function of the server. The multimedia service provider 1 has variously formatted multimedia contents, or has a transcoding function to provide the multimedia contents suitable to the UPnP AV devices 3 inside home. Such a function makes it possible to provide a home-adaptive multimedia service, which provides the content of a format most suitable to a home network environment and the UPnP AV device 3.

The home gateway 2 can drive the service gateway platform 23 such as an open service gateway initiative (OSGi) service platform. The home gateway 2 is connected in an environment supporting the UPnP stack with the multimedia service provider 1 using the network outside home to download a service bundle for an external multimedia service, and provides the information on the UPnP AV devices 3 of the home network to the multimedia service provider 1 to download or generate the virtual UPnP AV MediaServer service bundle 217 using the attribute of the UPnP AV MediaServer. Accordingly, the home gateway 2 allows the user inside home to get the external multimedia service in a way using the UPnP AV structure without the additional device.

The UPnP AV device 3 of the home network follows the UPnP AV structure. The UPnP AV device 3 includes a UPnP AV MediaServer 31, a UPnP AV MediaRenderer 32, and a UPnP AV control point 33. The UPnP AV MediaServer 31 inside home refers to a device having a function of the UPnP AV MediaServer in the UPnP AV structure such as personal video recorder (PVR), digital video disk (DVD) player and personal computer (PC). The UPnP AV MediaRenderer 32 refers to a device having a function of the UPnP AV MediaRenderer in the UPnP AV structure such as an audio device and a television set. The UPnP AV control point 33 refers to a device responding to a user's request using a user interface and performing a control point function in the UPnP AV structure, thereby controlling the UPnP AV MediaServer 31 and the UPnP AV MediaRenderer 32 on the home network to transmit the multimedia content from the UPnP AV MediaServer 31 to the UPnP AV MediaRenderer 32.

In the service gateway platform 23, service bundles operated in the home gateway 2 are managed and operated. In the service gateway platform 23, a management function of dynamically mounting, releasing, initiating and stopping the service bundles is performed, and service register and use are performed between the service bundles.

In the UPnP stack service bundle 22, a UPnP stack function such as discovery, device and service description, control, and event is performed on the service gateway platform 23 of the home gateway 2, and other service bundles of the service gateway platform 23 are allowed to use the UPnP stack function in a service format.

The UPnP stack service request bundle 21 is a service bundle of the service gateway platform 23 on the home gateway 2. As bundles requesting for and using the UPnP stack service of the UPnP stack service bundle 22, there are the UPnP AV MediaServer service bundle 212, the UPnP AV MediaRenderer service bundle 213, the UPnP AV control point service bundle 214, a UPnP device service bundle 211 and the like. Since the service bundle of the home gateway 2 uses a function of the UPnP stack service bundle 22, the home gateway 2 is recognized as a UPnP device in the actual UPnP devices of the home network. Accordingly, various UPnP devices can be embodied on the home gateway.

The UPnP stack API 25 of FIG. 3 can construct the UPnP stack, using program of the home gateway having the separate API without using a service bundle format of the service gateway platform 23. The UPnP stack service request bundles can respectively use the function of the UPnP stack using the API, irrespective of the service gateway platform.

An operation of the inventive multimedia service apparatus will be in detail described with reference to FIGS. 4 through 9.

A procedure of downloading the virtual UPnP AV MediaServer service bundle 217 will be in detail described with reference to FIG. 4.

The UPnP AV control point service bundle 214 collects information on the UPnP AV MediaServer and the UPnP AV MediaRenderer following the UPnP AV structure of the home network 2, using the UPnP stack, and transmits the information on the UPnP AV MediaServer and the UPnP AV MediaRenderer to the external multimedia service bundle 215. At this time, in an information transmission method, an XML file format or a service provision format of the service gateway platform can be used.

If the UPnP AV devices 3 are changed in number and kind, the UPnP AV control point bundle 214 senses the change through the UPnP protocol and notifies the external multimedia service bundle 215 of the sensed change.

The external multimedia service bundle 215 transmits the collected information on the UPnP AV devices 3, which follow the UPnP AV structure inside home, to the remotely placed multimedia service provider 1 through the external network. The multimedia service provider 1 downloads the virtual UPnP AV MediaServer service bundle 217, which provides the multimedia content of a format suitable to the UPnP AV device 3 inside home on the basis of the information provided from the external multimedia service bundle 215, to the home gateway 3 and operates the downloaded service bundle 217 in the service gateway platform 23.

After downloaded, the virtual UPnP AV MediaServer service bundle 217 informs other UPnP devices of its existence through the UPnP stack. One port of the home network interface 24 of the home gateway 2 is allocated as a port for transmitting the multimedia content to the UPnP AV MediaRenderer 32 inside home. The allocated port is designated and used as a resource characteristic of an object of a ContentDirectory of the UPnP AV MediaServer 31. One port of the external network interface 216 of the home gateway 2 is allocated as a port for receiving the multimedia content from the multimedia service provider 1. This is transmitted to the multimedia service provider 1 and is used in multimedia transmission.

A procedure of generating the virtual UPnP AV MediaServer service bundle 217 through the attribute designation of the virtual UPnP AV MediaServer 31 will be described with reference to FIG. 5 in the following.

The external multimedia service bundle 215 collects the information on the UPnP AV devices 3, which follow the UPnP AV structure inside home, from the UPnP AV control point bundle 214, and transmits the information on the UPnP AV devices 3 to the remotely placed multimedia service provider 1 through internet. The multimedia service provider 1 transmits the attribute of the virtual UPnP AV MediaServer 31, which can provide the multimedia content of format suitable to the UPnP AV device 3 inside home on the basis of the information provided from the external multimedia service bundle 215, to the external multimedia service bundle 215. The external multimedia service bundle 215 generates the virtual UPnP AV MediaServer service bundle 217 adaptively to the attribute, and initiates the generated service bundle 217 in the service gateway platform 23. When the virtual UPnP AV MediaServer service bundle 217 is generated and initiated, it informs other UPnP devices of its existence through the UPnP stack, and allocates the ports for multimedia content transmission on the home gateway.

A procedure of transmitting the virtual UPnP AV MediaServer content will be described with reference to FIG. 6 in the following.

In order to request for the external multimedia service, the user inside home searches for the multimedia content, which can be provided to the virtual UPnP AV MediaServer service bundle 217 of the home gateway 2, using the UPnP AV control point 33 of the home network. If so, the virtual UPnP AV MediaServer service bundle 217 responsively provides a ContentDirectory service of the UPnP AV structure. The user designates the UPnP AV MediaServer 31 for downloading and storing a desired content and UPnP AV MediaRenderer 32 or a content desired to be reproduced, and requests the virtual UPnP AV MediaServer service bundle 217 for content transmission.

The virtual UPnP AV MediaServer service bundle 217 provides the information on the requested content, the information on the number of the allocated port of the external network interface, and the information on the user's designating UPnP AV MediaRenderer 32 or UPnP AV MediaServer 31, to the multimedia service provider 1, and requests for the content transmission.

The multimedia service provider 1 selects the content of the most suitable format among the holding multimedia contents or transforms a content format, on the basis of information provided by the virtual UPnP AV MediaServer service bundle 217 and information transmitted by the external multimedia service bundle, to transmit the selected content or the content of the transformed format to the allocated port of the external network interface 216. The virtual UPnP AV MediaServer service bundle 217 transmits data, which is transmitted to the allocated port of the external network interface 216, to the allocated port of the home network interface 24, and transmits the content to the user's desiring UPnP AV device 3.

Figure 7:
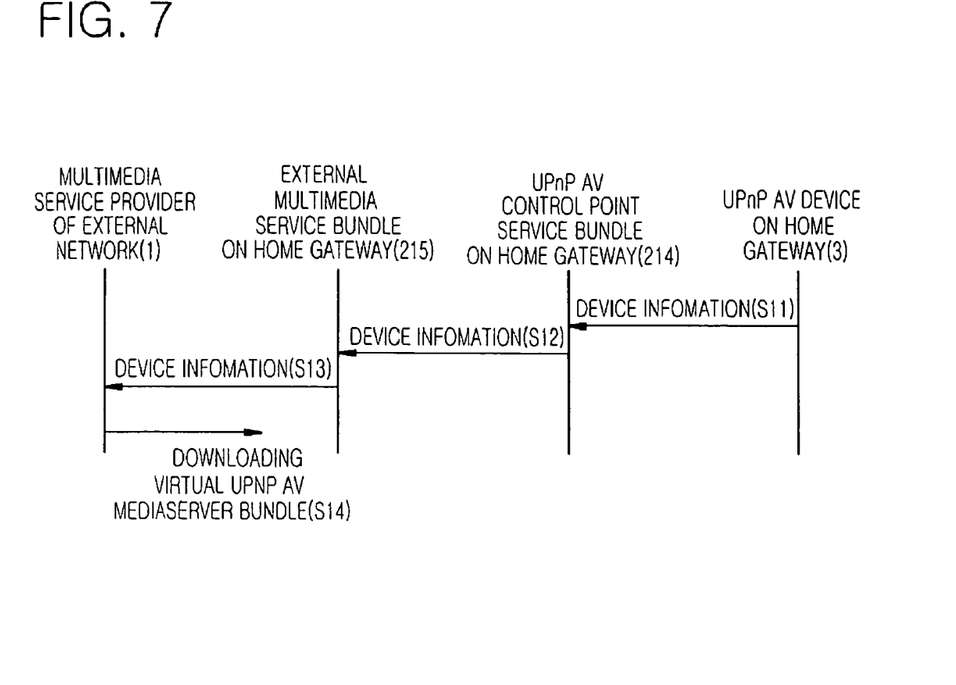
FIG. 7 illustrates a signal flowchart for downloading a virtual UPnP AV MediaServer service bundle according to an embodiment of the present invention.

A procedure of downloading the virtual UPnP AV MediaServer service bundle will be again described with reference to FIG. 7 in the following.

When the UPnP AV device 3 informs the UPnP AV control point bundle 214 of each device information using the UPnP protocol (S11), the UPnP AV control point bundle 214 informs the external multimedia service bundle 215 of the device information (S12). At this time, in the information transmission method, the XML file format and the service provision format of the service gateway platform can be used. The external multimedia service bundle 215 informs the multimedia service provider 1 of the device information (S13). The multimedia service provider 1 generates and downloads the most optimal virtual UPnP AV MediaServer service bundle 217 to the service gateway platform of the home gateway (S14).

Figure 8:
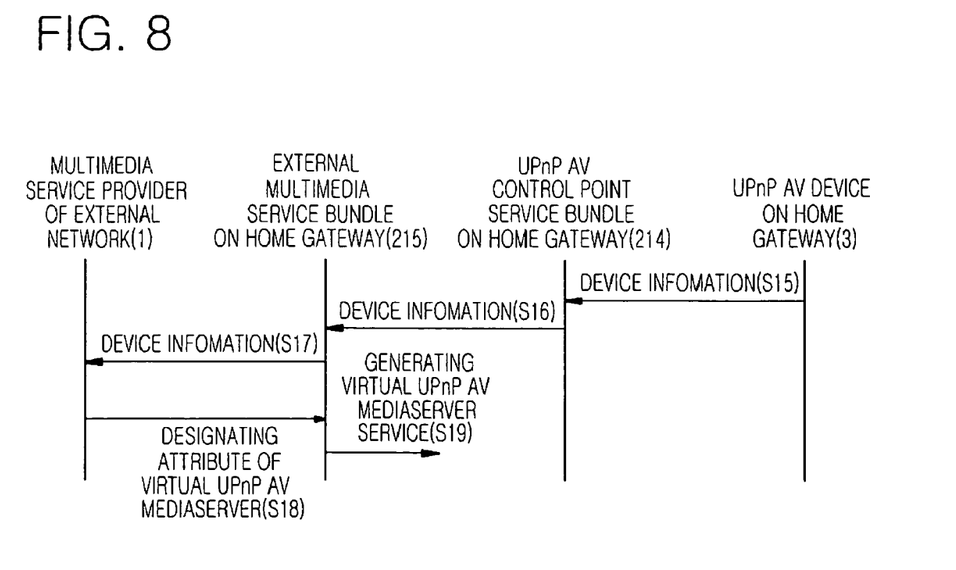
FIG. 8 illustrates a signal flowchart for generating a virtual UPnP AV MediaServer service bundle according to an embodiment of the present invention.

A procedure of generating the virtual UPnP AV MediaServer service bundle 217 through the attribute designation of the virtual UPnP AV MediaServer will be again described with reference to FIG. 8 in the following.

When the UPnP AV device 3 informs the UPnP AV control point bundle 214 of the home gateway of the device information using the UPnP protocol (S15), the UPnP AV control point bundle 214 informs the external multimedia service bundle 215 of the device information (S16). At this time, in the information transmission method, the XML file format or the service provision format of the service gateway platform can be used. The external multimedia service bundle 215 informs the multimedia service provider 1 of the device information (S17). When the multimedia service provider 1 transmits the attribute of the most optimal virtual UPnP AV MediaServer to the external multimedia service bundle 215 (S18), the external multimedia service bundle 215 generates the virtual UPnP AV MediaServer service bundle 217 and initiates the generated service bundle 217 in the service gateway platform (S19).

Figure 9:
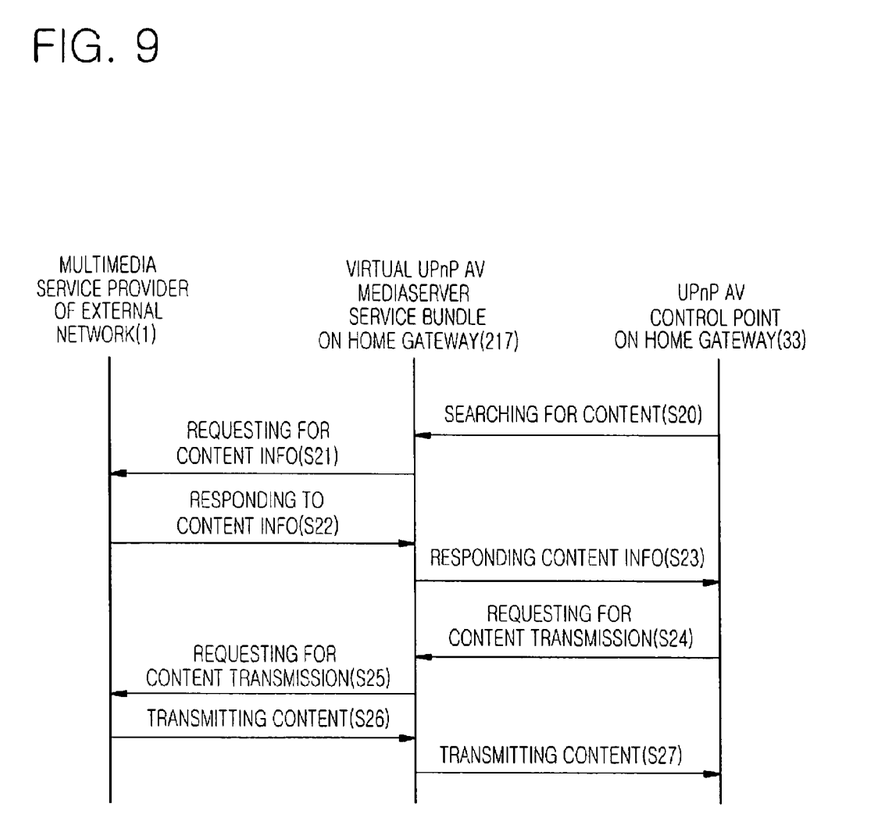
FIG. 9 illustrates a signal flowchart for transmitting a multimedia content using a virtual UPnP AV MediaServer service bundle according to an embodiment of the present invention.

A procedure of transmitting the content of the virtual UPnP AV MediaServer will be again described with reference to FIG. 9 in the following.

When the user requests for a multimedia content search using the UPnP AV control point 33 of the home network (S20), the virtual UPnP AV MediaServer service bundle 217 of the home gateway 2 requests for the multimedia content information, which can be provided to the multimedia service provider 1 of the external network, and acquires the multimedia content information (S21, S22). The virtual UPnP AV MediaServer service bundle 217 transforms the content information in a digital item declaration language (DIDL) format and provides the ContentDirectory service of the UPnP AV structure, thereby responding to the UPnP AV control point (S23).

When the user designates the content, which can be provided by the server, using the UPnP AV control point 33 of the home network, and requests for the transmission to a specific UPnP AV MediaRenderer or UPnP AV MediaServer (S24), the virtual UPnP AV MediaServer service bundle 217 transmits the information on the user's designating UPnP AV MediaRenderer 32 or UPnP AV MediaServer 31, the content information, the information on the number of the allocated port of the external network interface, and the like, to the multimedia service provider 1 of the external network, and requests for content transmission (S25). The multimedia service provider 1 transmits the content of the most suitable format in the designated format on the basis of the received information (S26). The virtual UPnP AV MediaServer service bundle 217 transmits the received content to the allocated port of the home network interface, and performs the content transmission (S27).

As described above, in the multimedia service apparatus and method, the service gateway platform such as the OSGi service platform for dynamically mounting and initiating the bundles is managed on the home gateway to transmit the information of the UPnP AV device of the home network inside home to the multimedia service provider outside home through the external network such as internet, and the virtual UPnP AV MediaServer is operated, thereby allowing the device following the UPnP AV structure of the home network inside home to use the multimedia service outside home without a specific additional device in the same way as the UPnP AV device inside home, and allowing the multimedia service provider outside home to use an inherent protocol, not the UPnP protocol, without change.

Further, in the inventive multimedia service apparatus and method, the multimedia service provider outside home can optimally select the selection item such as the multimedia transmission protocol and the content format on the basis of the information on the UPnP AV device inside home and accordingly, the home-adaptive multimedia service can be provided.

Furthermore, in the inventive multimedia service apparatus and method, the UPnP protocol and the service gateway platform such as the OSGi service platform can be used, thereby allowing the multimedia service provider to download and manage the service bundle through the external network, supporting various multimedia devices, and providing an additional multimedia service depending on a version change of a UPnP middleware, a definition of a new device of the UPnP middleware, an environmental change of the home network such as a newly added UPnP device on the network.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-home multimedia service system, comprising:
   a home network;
   a UPnP (Universal Plug and Play) AV (audio/video) device connected to said home network; and
   a home gateway connected to said UPnP AV device via said home network, connectable to a remote multimedia service provider via an external network, and comprising a service gateway platform for providing a multimedia service from the remote multimedia service provider to the UPnP AV device;
   wherein the home gateway further comprises:
   an external multimedia service bundle communicable with the remote multimedia service provider;
   a UPnP AV control point for detecting a change in number and/or kind of the UPnP AV device through the UPnP protocol and notifying the external multimedia service bundle of the detected change; and
   a virtual UPnP AV MediaServer service bundle updatable by the remote multimedia service provider based on the detected change forwarded from the external multimedia service bundle to the remote multimedia service provider.

2. The system of claim 1, wherein
   the virtual UPnP AV MediaServer service bundle is initiated in the service gateway platform for advertising its existence and UPnP service to the UPnP AV device of the home network through a UPnP stack and providing the UPnP service of a UPnP AV MediaServer to the UPnP AV device.

3. The system of claim 2, wherein the virtual UPnP AV MediaServer service bundle is configured to allocate a port to each of (i) an external network interface and (ii) a home network interface of the home gateway to receive and transmit multimedia content from the remote multimedia service provider to the UPnP AV device.

4. The system of claim 3, wherein the virtual UPnP AV MediaServer service bundle is configured to, in response to a search or access request received from a UPnP AV control point on the home network,
   send a query to the remote multimedia service provider, and
   acquire and transform multimedia content information, which is returned from the remote multimedia service provider in response to said query, in a DTDL (digital item declaration language) format to provide a UPnP AV structured ContentDirectory service.

5. The system of claim 4, wherein the virtual UPnP AV MediaServer service bundle is configured to, in response to a request from the UPnP AV control point for multimedia content transmission to a user-designated UPnP AV MediaRenderer or UPnP AV MediaServer on the home network,
   transmit (a) information on the user-designated UPnP AV MediaRenderer or UPnP AV MediaServer, (b) information on user-designated content, and (c) information on the allocated port of the external network interface to the remote multimedia service provider, and
   request multimedia content transmission from the remote multimedia service provider.

6. A multimedia service apparatus, comprising:
   an external network interface for connection to a remote multimedia service provider via an external network;
   a home network interface for connection to a UPnP (Universal Plug and Play) AV (audio/video) device via a home network;
   a service gateway platform;
   an external multimedia service bundle communicable with the remote multimedia service provider via the external network interface;
   a UPnP AV control point bundle managed in the service gateway platform for collecting and transmitting information on the UPnP AV device to the external multimedia service bundle through a service call of a service bundle or other ways; and
   a virtual UPnP AV MediaServer service bundle initiated in the service gateway platform by the remote multimedia service provider based on the collected information forwarded from the external multimedia service bundle to the remote multimedia service provider;
   wherein
   the UPnP AV control point bundle is configured for detecting a change in number and/or kind of the UPnP AV device through the UPnP protocol and notifying the external multimedia service bundle of the detected change; and
   the virtual UPnP AV MediaServer service bundle being updatable by the remote multimedia service provider based on the detected change forwarded from the external multimedia service bundle to the remote multimedia service provider.

7. The apparatus of claim 6, wherein the virtual UPnP AV MediaServer service bundle is configured for advertising its existence and UPnP service to the UPnP AV device of the home network through a UPnP stack and providing the UPnP service of a UPnP AV MediaServer to the UPnP AV device.

8. The apparatus of claim 7, wherein the virtual UPnP AV MediaServer service bundle is configured to allocate a port to each of (i) the external network interface and (ii) the home network interface to receive and transmit multimedia content from the remote multimedia service provider to the UPnP AV device.

9. The apparatus of claim 8, wherein the virtual UPnP AV MediaServer service bundle is configured to, in response to a search or access request received from a UPnP AV control point on the home network,
   send a query to the remote multimedia service provider, and
   acquire and transform multimedia content information, which is returned from the remote multimedia service provider in response to said query, in a DTDL (digital item declaration language) format to provide a UPnP AV structured ContentDirectory service.

10. The apparatus of claim 9, wherein the virtual UPnP AV MediaServer service bundle is configured to, in response to a request from the UPnP AV control point for multimedia content transmission to a user-designated UPnP AV MediaRenderer or UPnP AV MediaServer on the home network,
    transmit (a) information on the user-designated UPnP AV MediaRenderer or UPnP AV MediaServer, (b) information on user-designated content, and (c) information on the allocated port of the external network interface to the remote multimedia service provider, and
    request multimedia content transmission from the remote multimedia service provider.

11. A multimedia service method, comprising:

connecting a home gateway to a remote multimedia service provider via an external network and to a UPnP (Universal Plug and Play) AV (audio/video) device via a home network;

constructing, by the remote multimedia service provider, a virtual UPnP AV MediaServer service bundle on the basis of information on the UPnP AV device detected by an external multimedia service bundle of the home gateway;

downloading the virtual UPnP AV MediaServer service bundle to a service gateway platform of the home gateway and managing the downloaded virtual UPnP AV MediaServer service bundle in the service gateway platform to provide a multimedia service to the UPnP AV device on the home network;

detecting, by the external multimedia service bundle of the home gateway, a change in number and/or kind of the UPnP AV device through the UPnP protocol and notifying the remote multimedia service provider of the detected change; and updating the virtual UPnP AV MediaServer service bundle, by the remote multimedia service provider, based on the detected change.

12. The method of claim 11, wherein the virtual UPnP AV MediaServer service bundle advertises its existence and UPnP service to the UPnP AV device of the home network through a UPnP stack and providing the UPnP service of a UPnP AV MediaServer to the UPnP AV device.

13. The method of claim 12, wherein the virtual UPnP AV MediaServer service bundle allocates a port to each of (i) an external network interface and (ii) a home network interface of the home gateway to receive and transmit multimedia content from the remote multimedia service provider to the UPnP AV device.

14. The method of claim 13, wherein the virtual UPnP AV MediaServer service bundle, in response to a search or access request received from a UPnP AV control point on the home network, sends a query to the remote multimedia service provider, and acquires and transforms multimedia content information, which is returned from the remote multimedia service provider in response to said query, in a DIDL (digital item declaration language) format to provide a UPnP AV structured ContentDirectory service.

15. The method of claim 14, wherein the virtual UPnP AV MediaServer service bundle, in response to a request from the UPnP AV control point for multimedia content transmission to a user-designated UPnP AV MediaRenderer or UPnP AV MediaServer on the home network, transmits (a) information on the user-designated UPnP AV MediaRenderer or UPnP AV MediaServer, (b) information on user-designated content, and (c) information on the allocated port of the external network interface to the remote multimedia service provider, and requests multimedia content transmission from the remote multimedia service provider.

16. A multimedia service method, comprising:

connecting a home gateway to a remote multimedia service provider via an external network and to a UPnP (Universal Plug and Play) AV (audio/video) device via a home network;

constructing, by the remote multimedia service provider, an attribute of a virtual UPnP AV MediaServer on the basis of information on the UPnP AV device detected by an external multimedia service bundle of the home gateway;

transmitting the attribute to the external multimedia service bundle of the home gateway;

generating, by the external multimedia service bundle, a virtual UPnP AV MediaServer service bundle in a service gateway platform of the home gateway;

managing the virtual UPnP AV MediaServer service bundle by the service gateway platform to provide a multimedia service from the remote multimedia service provider to the UPnP AV device on the home network;

detecting, by the external multimedia service bundle of the home gateway, a change in number and/or kind of the UPnP AV device through the UPnP protocol and notifying the remote multimedia service provider of the detected change; and updating the virtual UPnP AV MediaServer service bundle, by the remote multimedia service provider, based on the detected change.

17. The method of claim 16, wherein the virtual UPnP AV MediaServer service bundle advertises its existence and UPnP service to the UPnP AV device of the home network through a UPnP stack and providing the UPnP service of a UPnP AV MediaServer to the UPnP AV device.

18. The method of claim 17, wherein the virtual UPnP AV MediaServer service bundle allocates a port to each of (i) an external network interface and (ii) a home network interface of the home gateway to receive and transmit multimedia content from the remote multimedia service provider to the UPnP AV device.

19. The method of claim 18, wherein the virtual UPnP AV MediaServer service bundle, in response to a search or access request received from a UPnP AV control point on the home network, sends a query to the remote multimedia service provider, and acquires and transforms multimedia content information, which is returned from the remote multimedia service provider in response to said query, in a DIDL (digital item declaration language) format to provide a UPnP AV structured ContentDirectory service.

20. The method of claim 19, wherein the virtual UPnP AV MediaServer service bundle, in response to a request from the UPnP AV control point for multimedia content transmission to a user-designated UPnP AV MediaRenderer or UPnP AV MediaServer on the home network, transmits (a) information on the user-designated UPnP AV MediaRenderer or UPnP AV MediaServer, (b) information on user-designated content, and (c) information on the allocated port of the external network interface to the remote multimedia service provider, and requests multimedia content transmission from the remote multimedia service provider.

21. A multimedia service method, comprising:

connecting a home gateway to a remote multimedia service provider via an external network and to a UPnP (Universal Plug and Play) AV (audio/video) device via a home network;

transmitting multimedia content of the most suitable format from the remote multimedia service provider to a designated port of an external network interface of the home gateway, on the basis of information on the UPnP AV device as detected by an external multimedia service bundle of the home gateway and in response to a request of a virtual UPnP AV MediaServer service bundle of the home gateway;

transmitting the multimedia content from said virtual UPnP AV MediaServer service bundle to an allocated port of a home network interface of the home gateway, to the UPnP AV device detecting, by the external multimedia service bundle of the home gateway, a change in number and/or kind of the UPnP AV device through the UPnP protocol and notifying the remote multimedia service provider of the detected change; and updating the virtual UPnP AV MediaServer service bundle, by the remote multimedia service provider, based on the detected change.

22. The method of claim 21, wherein the virtual UPnP AV MediaServer service bundle advertises its existence and UPnP service to the UPnP AV device of the home network through a UPnP stack and providing the UPnP service of a UPnP AV MediaServer to the UPnP AV device.

23. The method of claim 22, wherein the virtual UPnP AV MediaServer service bundle allocates a port to each of (i) an external network interface and (ii) a home network interface of the home gateway to receive and transmit multimedia content from the remote multimedia service provider to the UPnP AV device.

24. The method of claim 23, wherein the virtual UPnP AV MediaServer service bundle, in response to a search or access request received from a UPnP AV control point on the home network, sends a query to the remote multimedia service provider, and acquires and transforms multimedia content information, which is returned from the remote multimedia service provider in response to said query, in a DIDL (digital item declaration language) format to provide a UPnP AV structured ContentDirectory service.

25. The method of claim 24, wherein the virtual UPnP AV MediaServer service bundle, in response to a request from the UPnP AV control point for multimedia content transmission to a user-designated UPnP AV MediaRenderer or UPnP AV MediaServer on the home network, transmits (a) information on the user-designated UPnP AV MediaRenderer or UPnP AV MediaServer, (b) information on user-designated content, and (c) information on the allocated port of the external network interface to the remote multimedia service provider, and requests multimedia content transmission from the remote multimedia service provider.

* * * * *